(12) United States Patent
Gaugush et al.

(10) Patent No.: US 6,269,295 B1
(45) Date of Patent: Jul. 31, 2001

(54) METHOD AND APPARATUS FOR TRANSMISSION CONTROL DURING BRAKING

(75) Inventors: Susan J. Gaugush, Peoria; Milton C. Hubbard, Naperville; Marvin K. Palmer, Oswego; Matthew F. Schoenberg, Aurora; Wayne J. Wulfert, East Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/713,931

(22) Filed: Nov. 16, 2000

Related U.S. Application Data
(60) Provisional application No. 60/168,072, filed on Nov. 30, 1999.

(51) Int. Cl.[7] .................................................. B60K 41/04
(52) U.S. Cl. ............................... 701/55; 701/56; 701/53; 701/95; 192/220.1
(58) Field of Search .................................. 701/51, 53, 55, 701/56, 58, 70, 95; 192/215, 220, 220.1; 477/98, 95

(56) References Cited

U.S. PATENT DOCUMENTS

| | | |
|---|---|---|
| 3,667,579 | 6/1972 | Vizza . |
| 3,998,111 | 12/1976 | Blake . |
| 4,103,764 | 8/1978 | Iijima . |
| 4,113,076 | 9/1978 | Lee et al. . |
| 4,262,335 | 4/1981 | Ahlen et al. . |
| 4,757,449 | 7/1988 | Kazumasa et al. . |
| 4,955,255 | 9/1990 | Yamasushi et al. . |
| 4,965,728 | 10/1990 | Leising et al. . |
| 5,052,531 | * 10/1991 | Bota .................................. 192/220.1 |
| 5,101,943 | 4/1992 | Bulgrien . |
| 5,105,923 | 4/1992 | Iisuka . |
| 5,203,235 | 4/1993 | Iisuka . |
| 5,520,593 | 5/1996 | Yesel et al. . |
| 5,954,776 | * 9/1999 | Saito et al. ............................. 701/55 |
| 6,059,688 | * 5/2000 | Nozaki et al. .......................... 701/55 |
| 6,095,944 | * 8/2000 | Buchanan et al. ................. 192/220.1 |
| 6,173,228 | * 1/2001 | Carlson et al. .......................... 701/51 |

FOREIGN PATENT DOCUMENTS

405196119 * 8/1993 (JP) ........................................ 701/55

* cited by examiner

*Primary Examiner*—Richard M. Camby
(74) *Attorney, Agent, or Firm*—Byron G. Buck; Liza J. Meyers

(57) ABSTRACT

A method for operating machine transmission during braking, includes obtaining data relating to brake pedal position, machine velocity, machine engine speed, current transmission operating gear, and lowest operating gear. Next, downshifting thresh holds are set based on whether pedal position is in a downshift mode or a braking mode. Next, the transmission is downshifted if the machine velocity and machine engine speed are less than the downshifting thresh holds, and if the transmission operating gear is not the lowest operating gear. Next, the transmission is neutralized if the pedal position is in a neutralizing mode, if the velocity is less than a neutralizing thresh hold velocity, and if the transmission is in the lowest operating gear. Finally, the above steps are repeated until the transmission is neutralized.

6 Claims, 3 Drawing Sheets

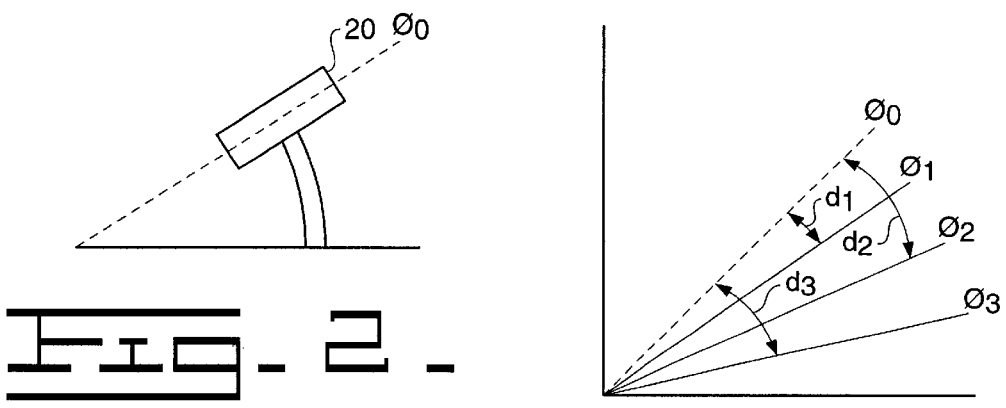
Fig. 2.
Fig. 3.
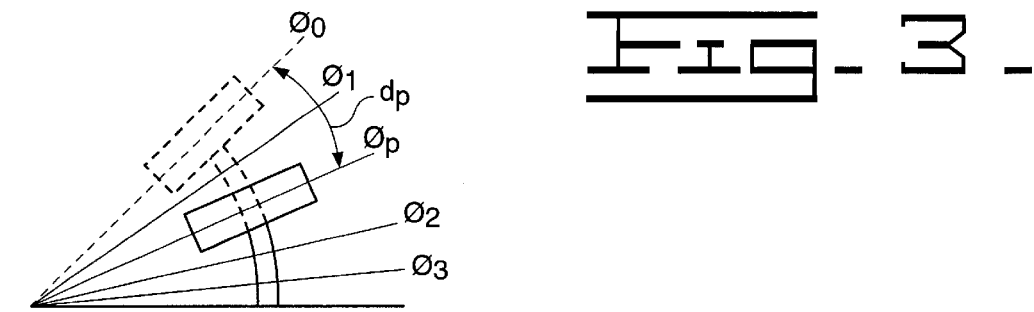
Fig. 4.
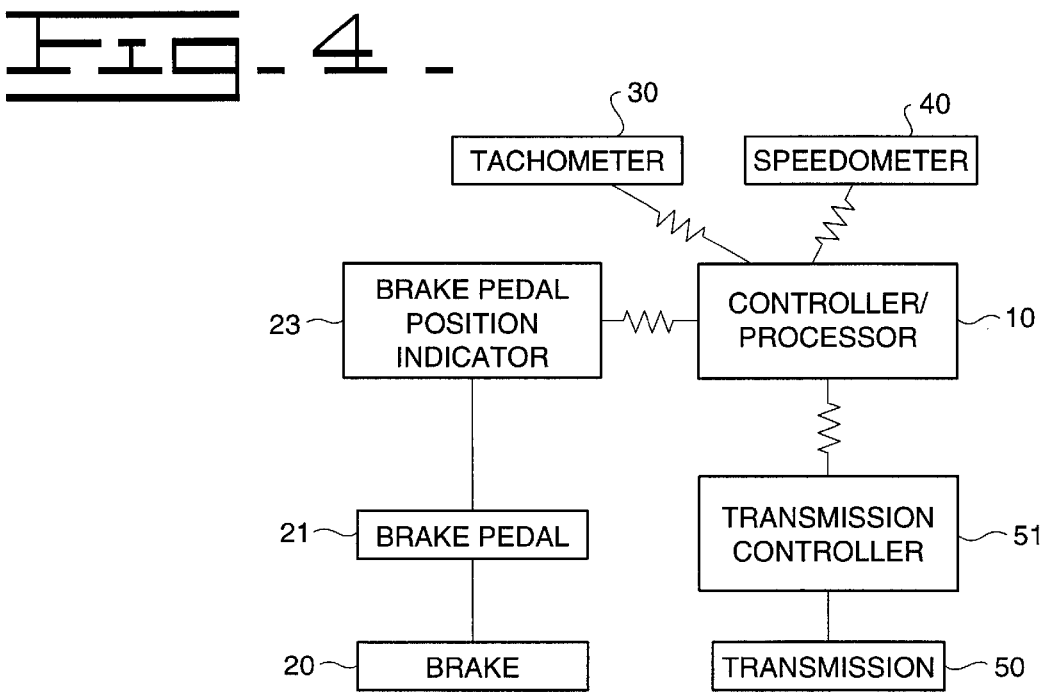
Fig. 1.

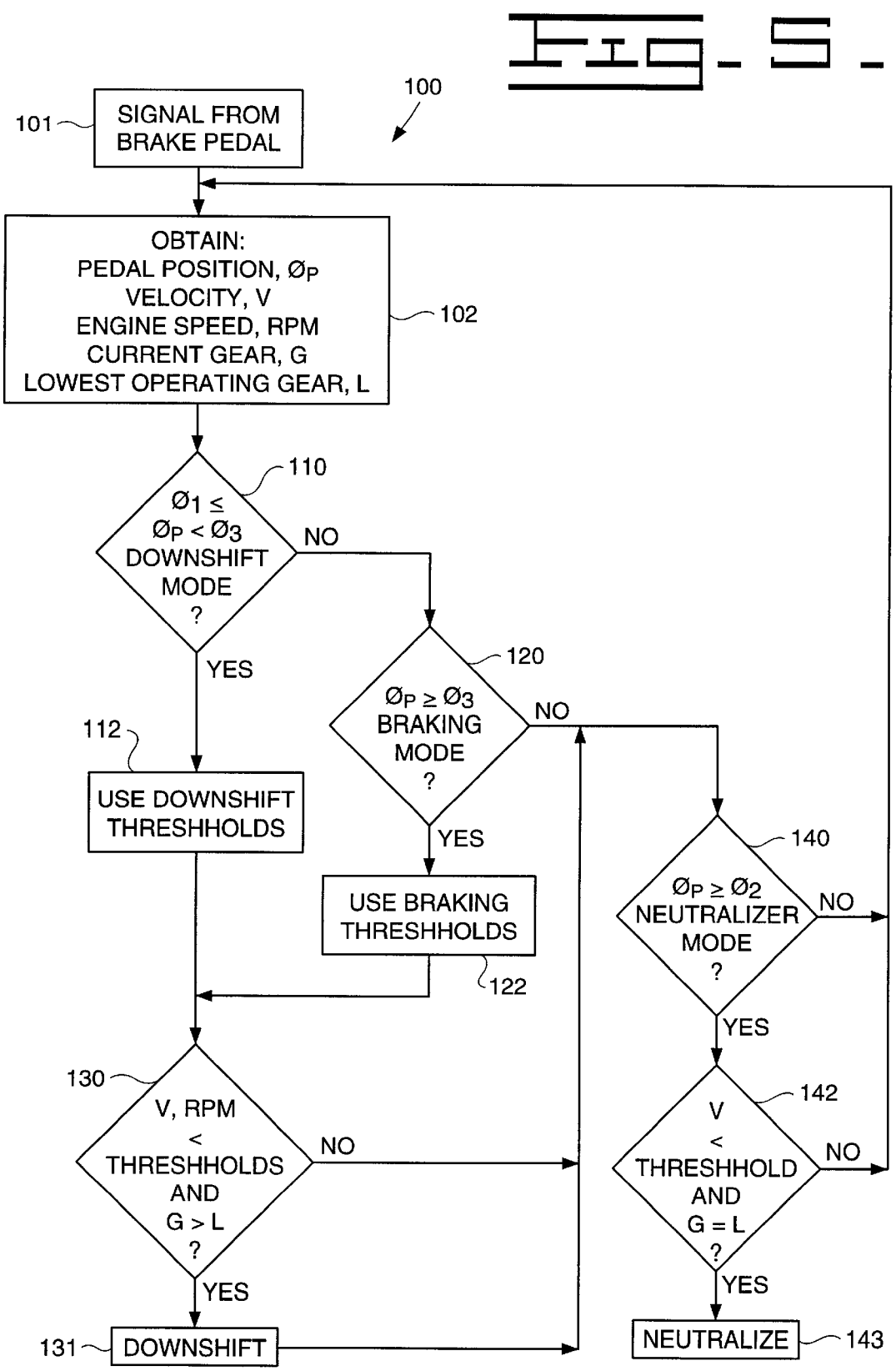

METHOD AND APPARATUS FOR TRANSMISSION CONTROL DURING BRAKING

This Application claim benefit to provisional application 60/168,072 Nov. 30, 1999.

TECHNICAL FIELD

The present invention relates to a machine having an engine and electronically controlled transmission, more particularly to an apparatus, method and product for transmission control, and even more particularly to an apparatus, method and product for transmission control during braking.

BACKGROUND ART

Brake systems of heavy machinery, non-limiting examples of which include wheel loaders and motor graders, generally include mechanism for shifting the transmission into neutral upon braking.

On most commercially available machines, the neutralizer function associated with the brake application is accomplished by providing an electric proximity switch which closes when the brake pedal is depressed a given amount. This electric signal is used by the transmission control to shift the transmission into neutral. When the pedal is released, the proximity switch opens and the transmission control re-engages the transmission. By the time the transmission re-engages, the brakes have been released. See for example, U.S. Pat. No. 3,998,111, issued Dec. 21, 1976 to Blake, and herein incorporated by reference.

One drawback of such a neutralizer control is that it provides poor inching capability in that it does not easily allow the operator to achieve slow, smooth machine movement without running against the torque converter. Consequently, some operators have been known to turn off the neutralizer function, using the standard neutralizer disable switch for all applications. This results in a reduction in service brake life, increased axle oil temperatures, possible reduction in differential and final drive gear and bearing lives, increased fuel consumption and increase in power train heat loads because the operator runs the machine against the torque converter by applying the brakes with transmission in gear.

In an effort to overcome some of the above described disadvantages, a few commercially available machines include operator selectable neutralizer operating modes to accommodate a variety of applications. These selectable modes usually provide two or three discrete brake pedal positions at which the transmission is shifted to neutral and re-engaged. However, these offer only a partial solution, as the correct mode for the application must be selected, and even that mode will not always provide adequate operation for all situations of that application.

Accordingly, the present invention is directed to overcoming one or more of the problems as set forth above.

DISCLOSURE OF THE INVENTION

In one aspect of the present invention, there is provided a neutralizing method for operating machine transmission during braking. The method includes obtaining data relating to brake pedal position, machine velocity, machine engine speed, current transmission operating gear, and lowest operating gear. The method also includes, setting downshifting thresh holds based on whether pedal position is in a downshift mode or a braking mode. The method even also include downshifting the transmission if the machine velocity and machine engine speed are less than the downshifting thresh holds, and if the transmission operating gear is not the lowest operating gear. The method still also includes neutralizing the transmission if the pedal position is in a neutralizing mode, if the velocity is less than a neutralizing thresh hold velocity, and if the transmission is in the lowest operating gear. Finally, the method includes repeating the above steps until the transmission is neutralized.

In another aspect of the present invention, there is provided an inching method of operating the transmission once is has been neutralized. This inching method may be operated with or independently of the neutralizing method described above. This inching method includes a data obtaining step of obtaining data relating to pedal position, including a current position and a maximum depressed depression position (MDDP). Next, if the current position exceeds the MDDP, the method includes resetting MDDP to the current position and repeating the data obtaining step. The method then includes engaging the transmission and allowing machine movement if the pedal position has moved a thresh hold amount away from the maximum depressed depression position. The method then includes repeating the data obtaining step if the brake pedal is not fully released. The method finally includes returning control to the automatic transmission controller.

In another aspect of the present invention, there is provided a computerized system for operating a machine transmission during braking. The system includes hardware and software for carrying out the neutralizing and/or inching methods as described above.

In even another aspect of the present invention, there is provided computer readable media comprising software for operating a machine transmission during braking. The software is suitable for carrying out the neutralizing and/or inching methods as described above.

BRIEF DESCRIPTION OF THE DRAWINGS

FIG. 1 is a schematic representation showing transmission neutralizer 10 of the present invention, brake pedal 21, brake 20, brake pedal position indicator 23, engine tachometer 30, speedometer 40, transmission controller 51, and transmission 50.

FIG. 2 is a schematic representation of brake pedal 21 at its undepressed position $\phi_0$ as shown.

FIG. 3 is a schematic representation showing pedal positions for the various operating modes for brake pedal 21.

FIG. 4 is a schematic representation showing pedal 21 in position $\phi_p$ relative to the various operating modes for brake pedal 21.

FIG. 5 is a flowchart depicting a method 100 of transmission control during braking.

BEST MODE FOR CARRYING OUT THE INVENTION

Figure 6:
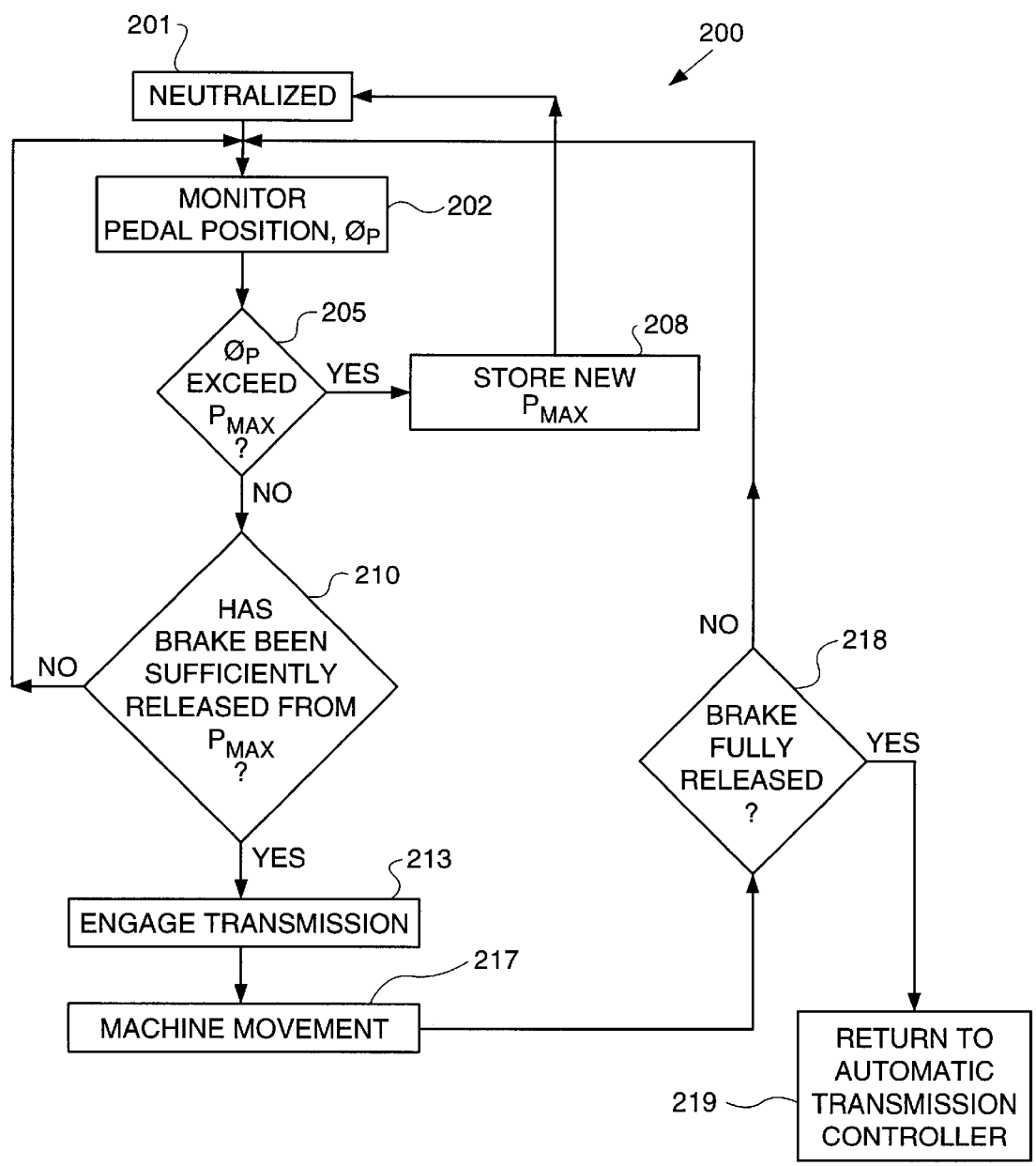
FIG. 6 is a flowchart depicting a method 200 of transmission control during inching.

Referring first to FIG. 1, there is provided a schematic representation showing transmission neutralizer 10 of the present invention, brake pedal 21, brake 20, brake pedal position indicator 23, engine tachometer 30, speedometer 40, transmission controller 51, and transmission 50.

In the present invention, brake pedal 21 operates to engage brake 20 as is well known in the art. Transmission 50 is generally an automatic transmission that is controlled by transmission controller 51, both of which are well known in the art.

Transmission neutralizer 10 is any suitable controller, such as a microprocessor or computer, that is capable of carrying out the method of the present invention.

Transmission neutralizer 10 receives input from sensors such as brake pedal position indicator 23 regarding the position of the brake pedal, from engine tachometer 30 regarding engine RPM's, and from speedometer 40 regarding machine velocity, and from transmission controller 51 regarding the current gear in which the transmission is operating, and the lowest possible operating gear, and based on that input provides an appropriate instruction to transmission controller 51 (of course, the instruction could be provided directly to transmission 50).

Referring now to FIG. 2, there is shown a brake pedal 21, at its undepressed position $\phi_0$ as shown. Referring now to FIG. 3, there are shown operating modes for brake pedal 21. It is noted that the downshifting mode and braking modes are mutually exclusive, whereas, the neutralizing mode may co-exist with one or both of the downshifting mode and braking modes. Specifically, as brake pedal 21 is depressed at least a distance $d_1$ to a position past position or angle $\phi_1$ (as measured from $\phi_0$) it enters the transmission downshift mode, depressed a distance $d_2$ to a position past position or angle $\phi_2$ (as measured from $\phi_0$) it also includes the transmission neutralizer mode (co-existing with the downshifting mode), and depressed a distance $d_3$ to a position past position or angle $\phi_3$ (as measured from $\phi_0$) it leaves the downshifting mode and enters the braking mode (with the neutralizer mode still operating). Positions or angles $\phi_1$ and $\phi_2$ may conveniently be selected as desired. For example, in many instances (and generally unintentionally), there is some amount of "play" or "dead time" between $\phi_0$ and $\phi_1$. Position or angle $\phi_2$ may be selected as desired to be either greater or less than position or angle $\phi_3$. Position or angle $\phi_3$ corresponds to the actual angle or position at which the brakes begin to become engaged. Of course, past position or angle $\phi_3$ the brakes are engaging.

Referring now to FIG. 4, brake pedal 21 is shown at one of an infinite number of possible positions. Specifically, brake pedal 21 is depressed a distance $d_p$ to a position or angle $\phi_p$ (as measured from $\phi_0$), which is in the downshifting mode of greater than $\phi_1$ but less than $\phi_3$. Notice also, that brake pedal 21 is also not in the neutralizer mode, because position or angle $\phi_p$ is less than $\phi_2$.

Referring now to FIG. 5, there is shown a flowchart depicting a method 100 of transmission control during braking. The method of the present invention is best carried out utilizing a computer, microprocessor or other programmable controller. Software embodying the method of the present invention may be stored on any suitable computer readable medium, non-limiting examples of which include tape, diskette, hard drive, RAM, ROM, CD, or stored on an Internet site for downloading.

At the start of method 100, a signal 101 is received from brake pedal position indicator 23. At step 102, pedal position $\phi_p$, machine ground velocity V, engine speed RPM, and current and lowest operating gears, are received from brake pedal position indicator 23, engine tachometer 30, speedometer 40, and transmission controller 51.

Next, operation flow goes to decision step 110 to determine if brake pedal 21 is in the downshift mode in which $\phi_1 < \phi_p \leq \phi_3$. If NO at decision step 110, that is, brake pedal 21 is not in the downshift mode, operation flow goes to decision step 120 which will be described hereinafter.

If YES at decision step 110, that is, brake pedal 21 is in the downshift mode, operation flow goes to step 112 to assign as thresh holds, the downshift thresh holds. These downshifting thresh holds are generally selected to downshift near the lower of the velocity range of any particular gear (as opposed to the braking thresh holds which are generally selected to downshift near the higher of the velocity range). Operational control then flows to decision step 130 which will be described hereinafter.

Decision step 120 determines if brake pedal 21 is in the braking mode in which $\phi_p \geq \phi_3$. If NO at decision step 120, that is, brake pedal 21 is not in the braking mode, operation flow goes to decision step 140 which will be described hereinafter.

If YES at decision step 120, that is, brake pedal 21 is in the braking mode, operation flow goes to step 122 to assign as thresh holds, the braking thresh holds. These braking thresh holds are generally selected to provide a more aggressive downshifting at higher speeds to assist in braking. These thresh holds are generally dependent upon the gear of operation. Operational control then flows to decision step 130 which will be described hereinafter.

Decision step 130 determines if velocity V and engine speed RPM are less than the selected thresh holds (either downshifting or braking thresh holds) and if downshifting is still possible (i.e., is G greater than L). For example, some commercial machines have transmission modes that allow the operator to selected gear modes other than the full range. In such a case, for a 4 speed automatic, it may be possible to select gear ranges 2–4 or 2–3, in which case the lowest gear would be $2^{nd}$. If NO at decision step 130, that is, the thresh hold amounts are still exceeded, then operational flow goes to decision step 140 which will be described hereinafter.

If YES to decision step 130, that is, the velocity V and engine RPM are below the thresh holds, then operational flow goes to step 131 which generates a downshift instruction. Operational flow goes to decision step 140 which will be described hereinafter. Decision step 140 determines if brake pedal 21 is in the neutralizer mode in which $\phi_p \geq \phi_2$. If NO at decision step 120, that is, brake pedal 21 is not in the neutralizer mode, operation flow goes back to step 102 to obtain updates on the pedal position $\phi_p$, machine ground velocity V, engine speed RPM, and current and lowest operating gears.

If YES at decision step 140, that is, brake pedal 21 is in the neutralizer mode, operation control then goes to decision step 142 to determine both if the velocity is less than a certain thresh hold velocity and if the current gear is the lowest operational gear (the currently selected downshifting or braking thresh holds may be utilized, or independent neutralizing thresh holds may be utilized). If NO at decision step 142, then operation flow goes back to step 102 to obtain updates on the pedal position $\phi_p$, machine ground velocity V, engine speed RPM, and current and lowest operating gears.

If YES at decision step 142, then operational flow goes to step 143 to generate a neutralizing instruction.

Referring now to FIG. 6, there is shown a flowchart depicting a method 200 of transmission control during inching. It should be understood that while the method of FIG. 6 is explained in connection with the method of FIG. 5, the method of FIG. 6 could be operated independently of the method of FIG. 5. Once the machine is neutralized at step 201, operational flow goes to step 202 to monitor brake pedal position P.

Operational flow then goes to decision step 205 to determine if the current pedal position $\phi_p$ is more depressed than the maximum pedal depression position $P_{max}$. If YES at decision step 205, that is, the current pedal position is depressed further than the old furthest pedal depression $P_{max}$, then operational flow goes to step 208 to store a new $P_{max}$, and then back to step 201 to again neutralize the transmission.

If NO at decision step 205, operational flow then goes to decision step 210 to determine if the current pedal position P is "sufficiently released" from the maximum depressed position $P_{max}$. What constitutes "sufficiently released" depends upon the operational situation, personal preferences of the operator and other such variables. For example, pedal movement of at least 2° away from the maximum depressed position. If NO at decision step 210, that is, brake pedal 21 is still too depressed, then operational flow return to step 202 to monitor pedal position.

If YES at decision step 210, that is, brake pedal 21 has been sufficiently released from it maximum depression, then operational flow goes to step 213 to instruct the transmission to engage.

Operational flow then goes to step 219, where the machine might be moving, and certainly continued releasing of brake 20 will result in machine travel. Operational flow then goes to decision step 218 to determine if brake 20 has been fully released.

If YES at decision step 218, then transmission control is returned to the automatic transmission controller.

If NO at decision step 218, then operational flow returns to step 202 to monitor pedal position $\phi_p$.

INDUSTRIAL APPLICABILITY

The present invention has utility for use in a wide variety of wheeled, belted and track machines, used in a wide variety of industrial fields, including, but not limited to forestry, agriculture, construction, mining, and excavating.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

Other aspects, objects and advantages of this invention can be obtained from a study of the drawings, the disclosure, and the appended claims.

What is claimed is:

1. A method for operating a transmission of a machine comprising an engine, the transmission and a brake pedal operated brake, wherein the brake pedal may be positioned in a downshifting mode, braking mode or neutralizer mode, the method comprising:
   (A) obtaining data relating to brake pedal position, machine velocity, machine engine speed, current transmission operating gear, and lowest operating gear;
   (B) setting downshifting thresh holds based on whether pedal position is in a downshift mode or a braking mode;
   (C) downshifting the transmission if the machine velocity and machine engine speed are less than the downshifting thresh holds, and if the transmission operating gear is not the lowest operating gear;
   (D) neutralizing the transmission if the pedal position is in a neutralizing mode, if the velocity is less than a neutralizing thresh hold velocity, and if the transmission is in the lowest operating gear; and
   (E) repeating steps (A) through (D) until the transmission is neutralized.

2. The method of claim 1, further comprising:
   (F) obtaining data relating to pedal position, including a current position and a maximum depressed depression position (MDDP);
   (G) if the current position exceeds the MDDP, resetting MDDP to the current position and repeating step (F);
   (H) engaging the transmission and allowing machine movement if the pedal position has moved a thresh hold amount away from the maximum depressed depression position;
   (I) if brake pedal is not fully released, repeating step (F); and
   (J) returning control to the automatic transmission controller.

3. A computerized system for operating a transmission of a machine comprising an engine, the transmission and a brake pedal operated brake, wherein the brake pedal may be positioned in a downshifting mode, braking mode or neutralizer mode, the system comprising computer hardware and the following software instructions:
   (A) instructions for obtaining current data relating to brake pedal position, machine velocity, machine engine speed, current transmission operating gear, and lowest operating gear;
   (B) instructions for setting downshifting thresh holds based on whether pedal position is in a downshift mode or a braking mode;
   (C) instructions for generating a transmission downshifting signal if the machine velocity and machine engine speed are less than the downshifting thresh holds, and if the transmission operating gear is not the lowest operating gear;
   (D) instructions for generating a transmission neutralizing signal if the pedal position is in a neutralizing mode, if the velocity is less than a neutralizing thresh hold velocity, and if the transmission is in the lowest operating gear; and
   (E) instructions for repeating instructions (A) through (D) until the transmission is neutralized.

4. The system of claim 3, further comprising:
   (F) instructions for obtaining data relating to pedal position, including a current position and a maximum depressed depression position (MDDP);
   (G) instructions for repeating instructions (F) if the current position exceeds the MDDP and for resetting MDDP to the current position; and
   (H) instructions for engaging the transmission and allowing machine movement if the pedal position has moved a thresh hold amount away from the maximum depressed depression position;
   (I) instructions to repeat instructions (F) if brake pedal is not fully released; and
   (J) instructions to return control to the automatic transmission controller.

5. A computer readable medium comprising software for operating a transmission of a machine comprising an engine, the transmission and a brake pedal operated brake, wherein the brake pedal may be positioned in a downshifting mode, braking mode or neutralizer mode, the medium comprising:

(A) instructions for obtaining current data relating to brake pedal position, machine velocity, machine engine speed, current transmission operating gear, and lowest operating gear;

(B) instructions for setting downshifting thresh holds based on whether pedal position is in a downshift mode or a braking mode;

(C) instructions for generating a transmission downshifting signal if the machine velocity and machine engine speed are less than the downshifting thresh holds, and if the transmission operating gear is not the lowest operating gear;

(D) instructions for generating a transmission neutralizing signal if the pedal position is in a neutralizing mode, if the velocity is less than a neutralizing thresh hold velocity, and if the transmission is in the lowest operating gear; and (E) instructions for repeating instructions (A) through (D) until the transmission is neutralized.

6. The medium of claim 5, further comprising:

(F) instructions for obtaining data relating to pedal position, including a current position and a maximum depressed depression position (MDDP);

(G) instructions for repeating instructions (F) if the current position exceeds the MDDP and for resetting MDDP to the current position; and (H) instructions for engaging the transmission and allowing machine movement if the pedal position has moved a thresh hold amount away from the maximum depressed depression position;

(I) instructions to repeat instructions (F) if brake pedal is not fully released; and (J) instructions to return control to the automatic transmission controller.

* * * * *